(12) United States Patent
Mizuno et al.

(10) Patent No.: US 9,447,875 B2
(45) Date of Patent: Sep. 20, 2016

(54) OIL PRESSURE CONTROLLED VEHICLE TRANSMISSION, POWER UNIT INCORPORATING SAME, AND METHOD OF USING SAME

(75) Inventors: Kinya Mizuno, Saitama (JP); Yasushi Fujimoto, Saitama (JP); Seiji Hamaoka, Saitama (JP); Eiji Kittaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1161 days.

(21) Appl. No.: 11/710,853

(22) Filed: Feb. 26, 2007

(65) Prior Publication Data

US 2007/0199782 A1    Aug. 30, 2007

(30) Foreign Application Priority Data

Feb. 28, 2006 (JP) .................................. 2006-053844

(51) Int. Cl.
  *F16H 61/688* (2006.01)
  *F16H 61/04* (2006.01)
  *F16D 21/06* (2006.01)
  (Continued)

(52) U.S. Cl.
  CPC ............ *F16H 61/688* (2013.01); *F16D 48/062* (2013.01); *F16H 61/0437* (2013.01); *F16D 2021/0623* (2013.01); *F16D 2048/0203* (2013.01); *F16D 2048/0266* (2013.01); *F16H 2061/0485* (2013.01); *F16H 2061/0488* (2013.01); *F16H 2312/02* (2013.01); *F16H 2312/022* (2013.01)

(58) Field of Classification Search
  CPC ................ F16D 2021/0623; F16D 2048/0215; F16D 2048/0266

USPC .......................... 192/3.57, 3.58, 48.611, 85.63
See application file for complete search history.

(56) References Cited

U.S. PATENT DOCUMENTS 2,376,545 A * 5/1945 Livermore ...................... 74/330
3,064,779 A * 11/1962 Christenson ................ 192/85 R
3,089,572 A * 5/1963 Herfurth ...................... 192/3.63

(Continued)

FOREIGN PATENT DOCUMENTS

JP        11-201271 A       7/1999
JP        2005-273829       10/2005

OTHER PUBLICATIONS

Hori et al. (JP 2005-101035).*

*Primary Examiner* — Robert Hodge
*Assistant Examiner* — Terry Chau
(74) *Attorney, Agent, or Firm* — Carrier Blackman & Associates, P.C.; Joseph P. Carrier; William D. Blackman

(57) ABSTRACT

A transmission for a vehicle is provided which prevents generation of a speed change shock at the time of starting the vehicle from a neutral condition. In the transmission, hydraulic clutches are each put into a connected state according to an action of an oil pressure, and a plurality of selectively engageable speed-stage gear trains are provided so that a neutral condition can be obtained. At the time of shifting from the neutral condition, where the oil pressures in hydraulic clutches are in a lowered state, to a starting condition in which a starting gear train is engaged, pressure in the hydraulic clutch corresponding to the starting gear train is controlled by a control valve, so that the oil pressure in the hydraulic clutch is maintained in the lowered state during and immediately after a shifting operation, and is subsequently increased in response to complete engagement of the starting gear train.

3 Claims, 9 Drawing Sheets

(51) Int. Cl.
*F16D 48/02* (2006.01)
*F16D 48/06* (2006.01)

(56) References Cited

U.S. PATENT DOCUMENTS

| | | | | |
|---|---|---|---|---|
| 3,550,507 | A | * | 12/1970 | Schott ................................ 91/446 |
| 3,707,890 | A | * | 1/1973 | Ito ................................... 477/151 |
| 4,422,536 | A | * | 12/1983 | Shatuck ............................ 192/3.57 |
| 4,560,044 | A | * | 12/1985 | Nagata ............................. 192/3.57 |
| 4,560,047 | A | * | 12/1985 | McCarthy et al. ............ 192/52.4 |
| 4,711,329 | A | | 12/1987 | Hasegawa et al. |
| 5,136,897 | A | * | 8/1992 | Boardman ....................... 477/84 |
| 5,259,260 | A | * | 11/1993 | Schneider ........................ 74/331 |
| 5,603,242 | A | * | 2/1997 | Krieger ............................ 74/335 |
| 5,667,052 | A | * | 9/1997 | Richardson .................. 192/85 R |
| 6,009,768 | A | | 1/2000 | Hoshiya et al. |
| 6,470,763 | B2 | * | 10/2002 | Ohashi et al. .................... 74/335 |
| 6,675,668 | B2 | * | 1/2004 | Schamscha ...................... 74/340 |
| 6,805,655 | B2 | * | 10/2004 | Hori et al. ...................... 477/121 |
| 6,951,526 | B2 | * | 10/2005 | Kuhstrebe et al. .............. 477/97 |
| 7,305,900 | B2 | | 12/2007 | Suzuki et al. |
| 2004/0178041 | A1 | * | 9/2004 | Kraxner et al. ............ 192/87.19 |
| 2005/0150318 | A1 | * | 7/2005 | Baldascini et al. .............. 74/331 |
| 2005/0211007 | A1 | * | 9/2005 | Suzuki et al. ................... 74/340 |
| 2006/0219034 | A1 | * | 10/2006 | Hori et al. ....................... 74/330 |
| 2007/0068297 | A1 | * | 3/2007 | Hori et al. ....................... 74/335 |

* cited by examiner

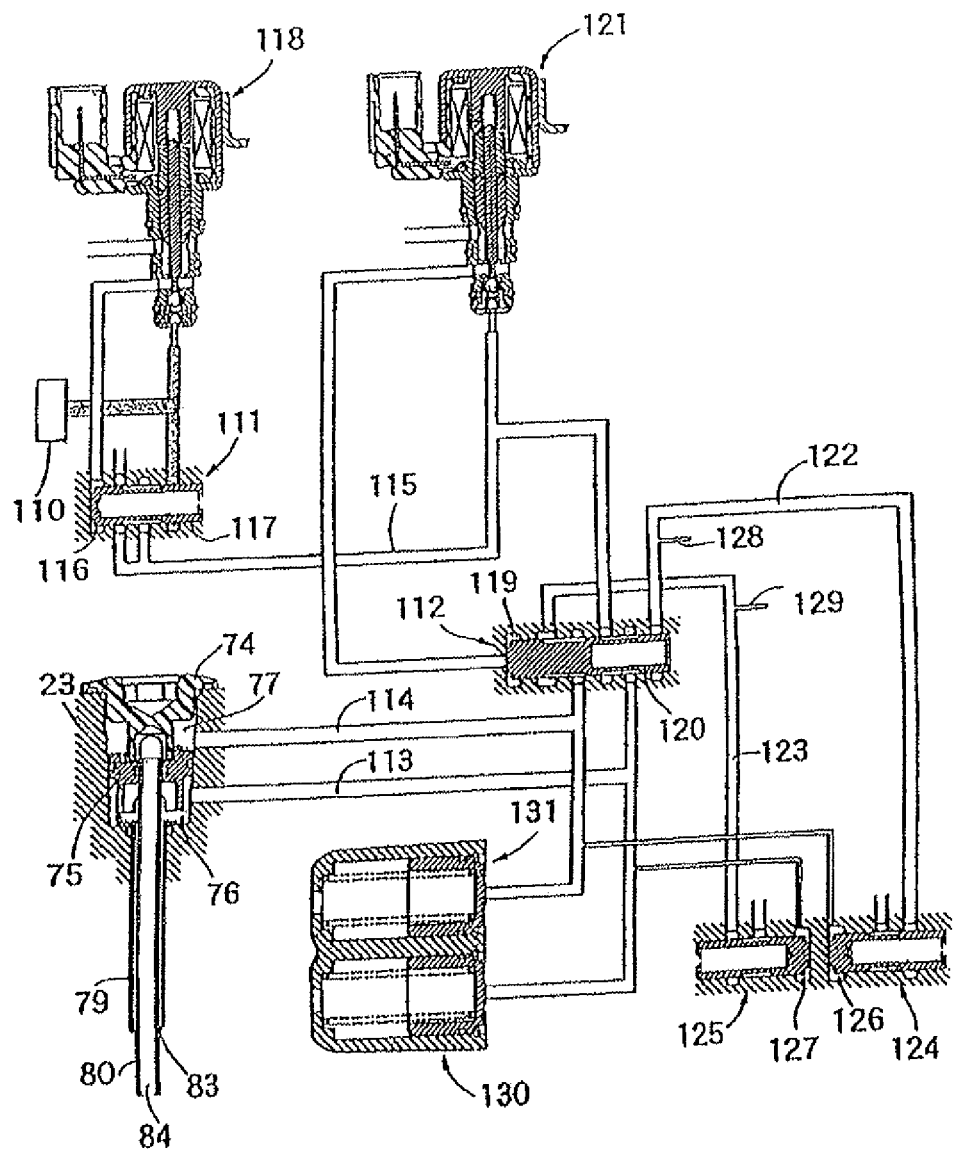
FIG. 4
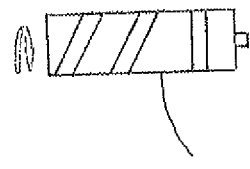
200

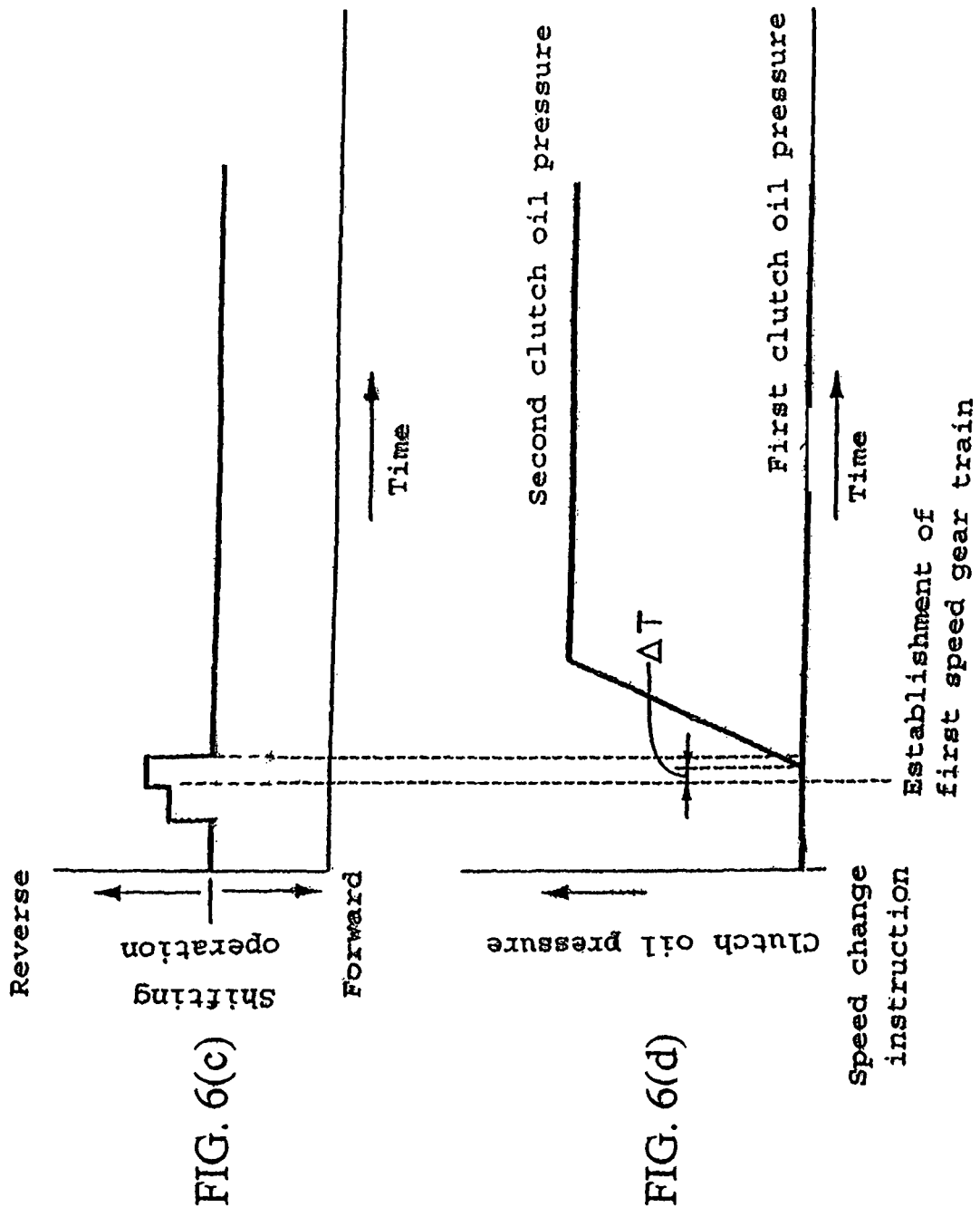

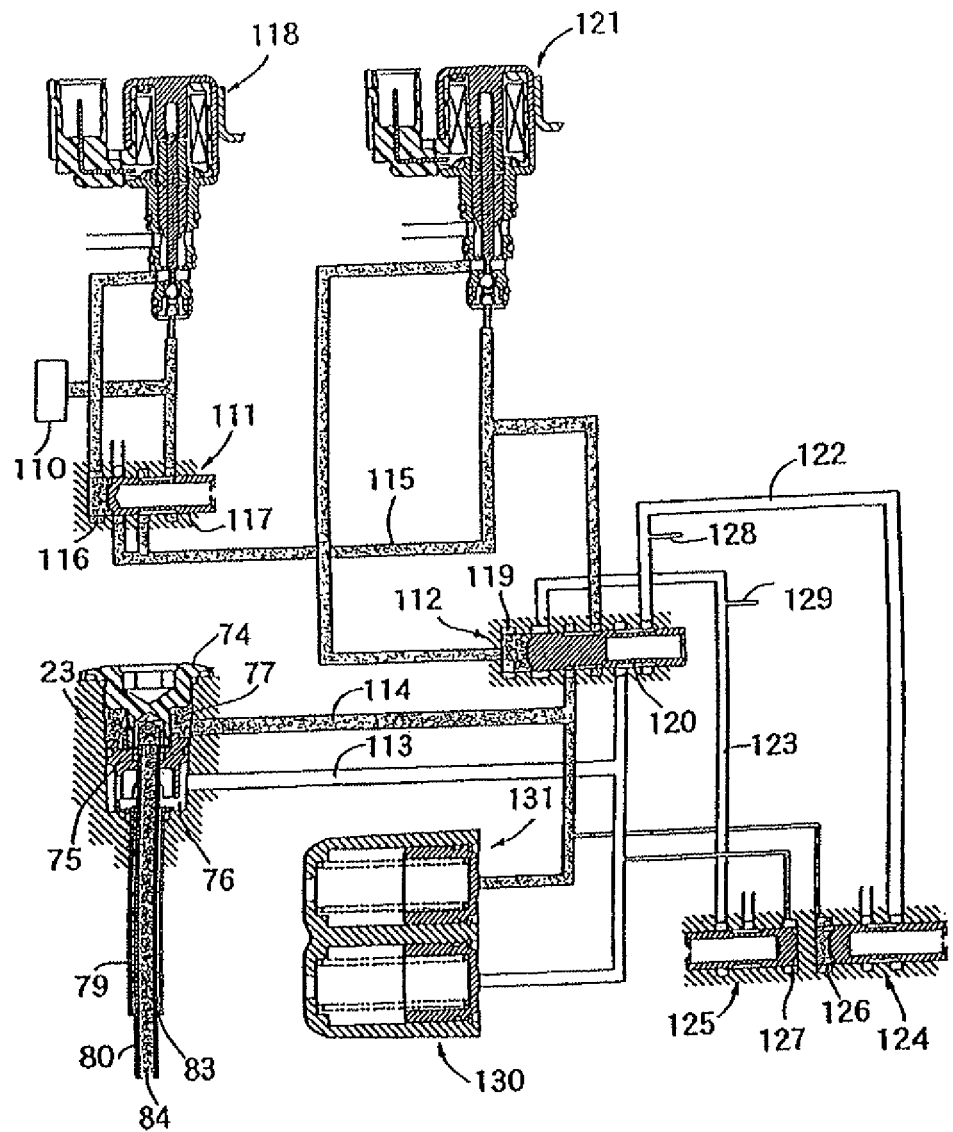
FIG. 7
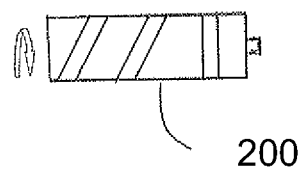

OIL PRESSURE CONTROLLED VEHICLE TRANSMISSION, POWER UNIT INCORPORATING SAME, AND METHOD OF USING SAME

CROSS-REFERENCE TO RELATED APPLICATIONS

The present invention claims priority under 35 USC 119 based on Japanese patent application No. 2006-053844, filed on Feb. 28, 2006. The entire subject matter of this priority document, including specification, drawings, and claims, is incorporated by reference.

BACKGROUND OF THE INVENTION

1. Field of the Invention

The present invention relates to a transmission for a vehicle wherein hydraulic clutches are provided between a crankshaft and main shafts of an power unit, each hydraulic clutch being put into a connected state by adjustment of oil pressure therein, and wherein a plurality of selectively connectable speed-stage gear trains are provided between a transmission output shaft and the main shafts in such a manner that a neutral condition can be obtained.

2. Description of the Background Art

A conventional transmission for a vehicle includes a plurality of speed-stage gear trains divided into two groups. In the transmission, two hydraulic clutches are used to achieve individual changeover of connection and disconnection of power from a crankshaft to both groups of gear trains. The two hydraulic clutches are controlled so that one of the hydraulic clutches is put into a disconnected state when the other is in a connected state, and both of the hydraulic clutches are put into the disconnected state in a neutral condition, where no gear train is engaged. A conventional transmission of this type is disclosed, for example, in Japanese Patent Laid-Open No. 2005-273829.

However, in the transmission disclosed in Japanese Patent Laid-Open No. 2005-273829, at the time of an engaging operation of a starting gear train for making a transition from a neutral condition to a starting condition, an oil pressure is applied to the hydraulic clutch corresponding to the starting gear train to thereby put the hydraulic clutch into the connected state. Therefore, when the oil pressure acts on the hydraulic clutch, even though the hydraulic clutch is not in a perfect connected state, a speed change shock is generated due to drag of the hydraulic clutch.

The present invention has been made in consideration of the above circumstances. Accordingly, it is an object of the present invention to provide a transmission for a vehicle in which a speed change shock is not generated at the time of starting from a neutral condition.

SUMMARY

In order to attain the above object, an inventive transmission for a vehicle is presented. A first aspect of the invention resides in a transmission for a vehicle, including hydraulic clutches provided between a crankshaft and main shafts of a power unit, each hydraulic clutch being put into a connected state according to an action of oil pressure therein. A plurality of selectively engageable speed-stage gear trains are provided between a transmission output shaft and the main shafts so that a condition where no gear train is engaged can be obtained. The first aspect of the invention is characterized in that a control valve is provided for controlling the oil pressures in the hydraulic clutches in such a manner that, at the time of shifting from a neutral condition, where every one of the plurality of speed-stage gear trains is in a non-engaged state, and the oil pressures in the hydraulic clutches are lowered to a starting condition for engaging a starting gear train of the plurality of speed-stage gear trains in order to initiate motion of the vehicle, the oil pressure in the hydraulic clutch corresponding to the starting gear train is maintained in the lowered state even after the shifting operation, and is thereafter increased in response to completion of engagement of the starting gear train.

According to the first aspect of the invention, at the time of starting from the neutral condition, the oil pressure in the hydraulic clutch for transmitting power from the crankshaft to the starting gear train is maintained in a lowered state and is thereafter increased in response to complete engagement of the starting gear train. Therefore, the transmission of power between the gear train and the crankshaft is perfectly interrupted at the time when the starting gear train is engaged, so that a shock can be prevented from being generated at the time of starting.

A second aspect of the invention is characterized in that, in addition to the configuration according to the first aspect of the invention, at least two hydraulic clutches are provided between the crankshaft and the main shafts, and the control valve is commonly connected to all the hydraulic clutches.

According to the second aspect of the invention, the control valve is laid out in common for the at least two hydraulic clutches, whereby variations in the oil pressures in all the hydraulic pressures can be controlled by the single control valve.

A third aspect of the invention is characterized in that, in addition to the configuration according to the first or second aspects of the invention, the transmission includes at least a first hydraulic clutch for transmitting power from the crankshaft to a forward low-speed gear train, and at least a second hydraulic clutch for transmitting power from the crankshaft to a reverse gear train.

According to the third aspect of the invention, shocks at the times of forward-side starting and reverse-side starting can be eliminated by the single control valve.

A fourth aspect of the invention is characterized in that, in addition to the configuration according to the third aspect of the invention, the transmission further includes first and second individual oil passages communicating individually to the respective first and second clutches, a common oil passage that is common to the first and second individual oil passages, an oil pressure source, and a selector valve. The selector valve is adapted to permit alternative changeover between the communication of the first individual oil passage with the common oil passage, and the communication of the second individual oil passage with the common oil passage. The control valve operates in such a manner as to permit changeover between a condition where the oil pressure source communicates with the common oil passage, and a condition where the pressure in the common oil passage is released. The fourth aspect of the invention is characterized in that the control valve and the selector valve are interposed between the common oil passage and the first and second individual oil passages.

According to the fourth aspect of the invention, variations in the oil pressures in the two hydraulic clutches can be individually controlled by the simple hydraulic circuit composed by use of the single control valve and the single selector valve.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

FIG. 4 is a schematic diagram of the oil pressure control system according to a first embodiment thereof, showing the configuration of the oil pressure control system in a neutral condition.

FIG. 6(*b*) is a graph of clutch oil pressure versus time, and shows the increase in first clutch oil pressure after a predetermined time from the shifting from the neutral condition to the forward-side starting condition.

FIG. 6(*c*) is a graph of shifting operation versus time, and shows a shifting operation at the time of shifting from the neutral condition to the reverse-side starting condition.

FIG. 6(*d*) is a graph of clutch oil pressure versus time, and shows the increase in first clutch oil pressure after a predetermined time from the shifting from the neutral condition to the reverse-side starting condition.

FIG. 7 is a schematic diagram of the oil pressure control system according to a first embodiment thereof, showing the configuration of the oil pressure control system at the time of shifting from the neutral condition to a reverse-side starting condition.

DETAILED DESCRIPTION

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

FIGS. 1 to 7 show a number of views of a power unit including a transmission according to an illustrative embodiment of the present invention.

Figure 1:
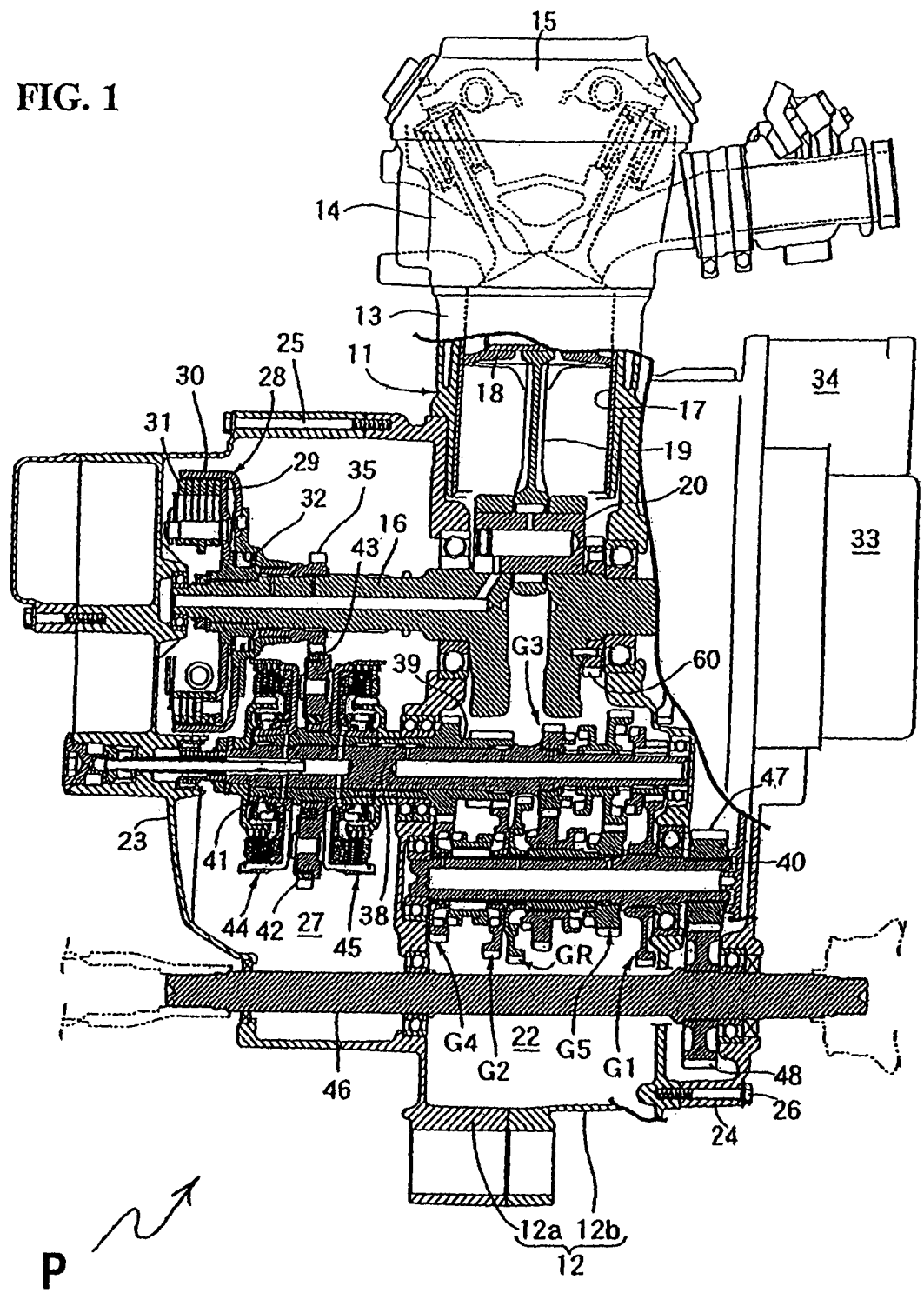
FIG. 1 is a side partial sectional view of a power unit, including an internal combustion engine and a transmission according to a first embodiment of the present invention, showing first and second hydraulic clutches acting between a crankshaft and main shaft of the power unit.

First, in FIG. 1, a power unit P is adapted to be mounted on a vehicle. The power unit P is an integrated and combined engine and transmission assembly, including a hollow crankcase 12 having many other components mounted therein. The power unit P further includes an engine body 11 in which the crankcase 12 rotatably supports a crankshaft 16 thereon, and a cylinder block 13 is connected to an upper portion of the crankcase 12. The power unit P also includes a cylinder head 14 connected to an upper portion of the cylinder block 13, and a head cover 15 connected to an upper portion of the cylinder head 14. A piston 18, slidably fitted in a cylinder bore 17 in the cylinder block 13, is connected to the crankshaft 16 through a connecting rod 19 and a crank pin 20.

The crankcase 12 includes a pair of case halves 12*a* and 12*b* coupled at a plane orthogonal to the axis of rotation of the crankshaft 16, and a crank chamber 22 is formed inside the crankcase 12. In addition, first and second crankcase covers 23 and 24, constituting a part of the engine body 11, are fastened to both sides of the crankcase 12 by a plurality of bolts 25, 26, and a clutch accommodating chamber 27 is formed between the crankcase 12 and the first crankcase cover 23. The clutch accommodating chamber 27 communicates with the crank chamber 22 and houses a centrifugal clutch 28.

One end of the crankshaft 16 protrudes from the crankcase 12, and is rotatably supported on the first crankcase cover 23. At a position proximate to the first crankcase cover 23, the centrifugal clutch 28 is mounted to one end portion of the crankshaft 16 through a one-way clutch 32. A generator (not shown) is disposed between the crankcase 12 and the second crankcase cover 24, and is connected to the other end portion of the crankshaft 16 protruding from the crankcase 12. A recoil starter 33, attached to the second crankcase cover 24, is also connected to the other end portion of the crankshaft 16. In addition, a starting motor 34, which inputs starting power to the crankshaft 16, is attached to the second crankcase cover 24.

The centrifugal clutch 28 includes a drive plate 29, a clutch housing 30, and a clutch weight 31. The drive plate 29 is fixed to the crankshaft 16, and the bowl-shaped clutch housing 30 coaxially covers the drive plate 29 so as to be rotated together with a drive gear 35 relatively rotatably mounted onto the crankshaft 16. The clutch weight 31 is rotatably supported by the drive plate 29 so that it can make frictional engagement with the inner periphery of the clutch housing 30, according to the action of centrifugal force resulting from the rotation of the crankshaft 16. The one-way clutch 32 is provided between the clutch housing 30 and the drive plate 29, so as to permit transmission of power from the drive gear 35 to the crankshaft 16.

On the other hand, first and second main shafts 38 and 39 are arranged coaxially with the tubular second main shaft 39 acting as a tubular sleeve surrounding part of the centrally disposed first main shaft 38. The first and second main shafts 38 and 39 are capable of relative rotation about the same axis, and are supported on the crankcase 12 so as to be rotatable about an axis parallel to the axis of rotation of the crankshaft 16. A transmission output shaft 40 is parallel to the first and second main shafts 38 and 39, and is rotatably supported on the crankcase 12.

In addition, a drive shaft 46 having an axis parallel to the axis of rotation of the crankshaft 16 is rotatably borne on the one-side case half 12*a*, of the case halves 12*a* and 12*b* of the crankcase 12, and the second crankcase cover 24. Both ends of the drive shaft 46 outwardly penetrate the first and second crankcase covers 23 and 24 in a liquid-tight and rotatable manner. On the other hand, a drive gear 47 is fixed to an end portion of the transmission output shaft 40 protruding from the other-side case half 12*b*, of the case halves 12*a* and 12*b* of the crankcase 12. A driven gear 48, meshed with the drive gear 47, is provided on the drive shaft 46.

A power-transmitting tubular shaft 41 is relatively rotatably mounted onto the first main shaft 38 in the clutch accommodating chamber 27. Power is transmitted to the power transmitting tubular shaft 41 through the drive gear 35 relatively rotatably mounted onto the crankshaft 16, a driven gear 42 meshed with the drive gear 35, and a rubber damper 43. In addition, a first hydraulic clutch 44 is provided between the power transmitting tubular shaft 41 and the first main shaft 38. A second hydraulic clutch 45 is provided between the power transmitting tubular shaft 41 and the second main shaft 39, and is so located that the driven gear 42 is interposed between the first hydraulic clutch 44 and the second hydraulic clutch 45.

Figure 2:
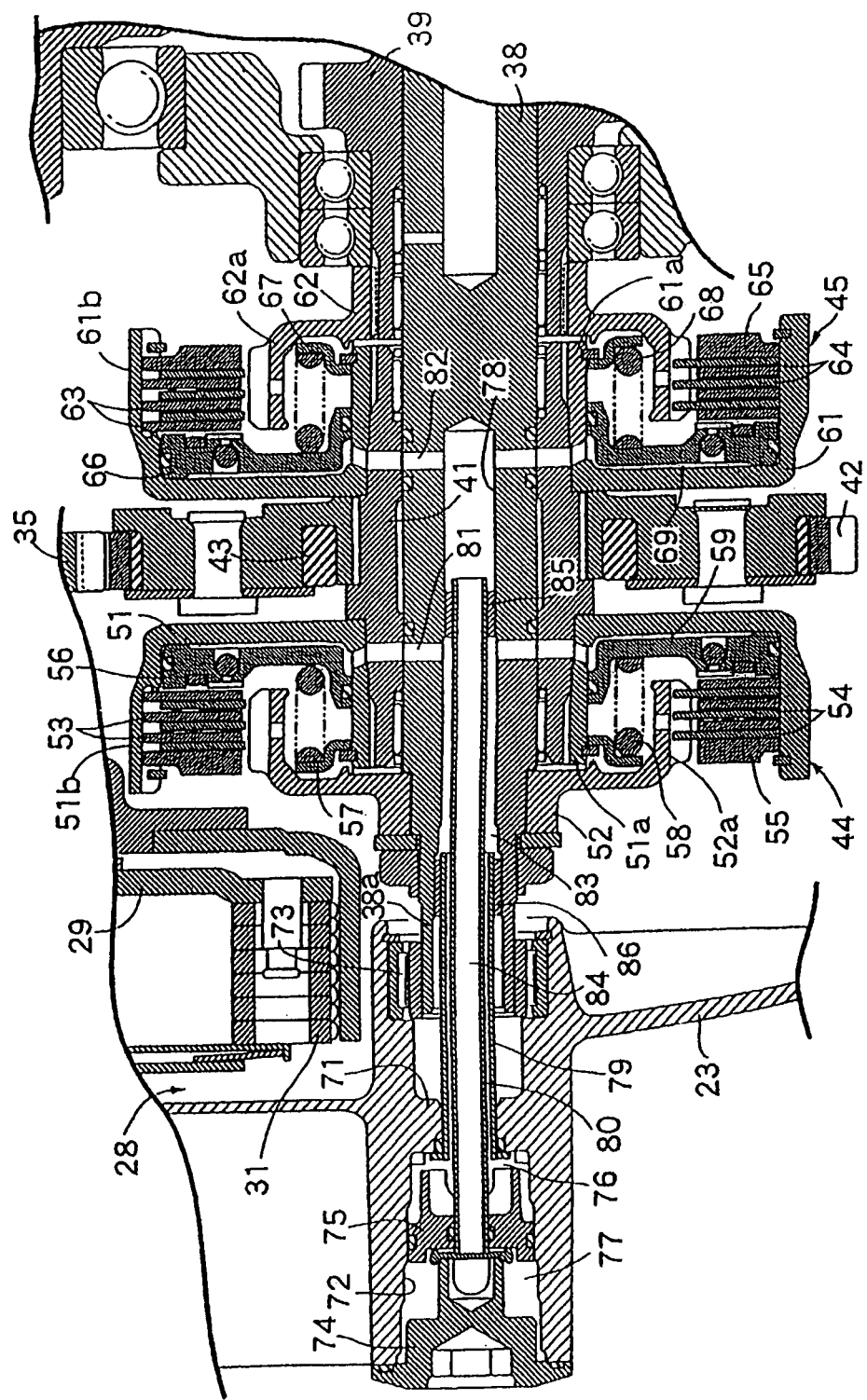
FIG. 2 is an enlarged side sectional view of the vicinity of first and second hydraulic clutches.

In FIG. 2, the first hydraulic clutch 44 includes a first clutch outer 51 which has an inner tube portion 51a surrounding the power transmitting tubular shaft 41, and an outer tube portion 51b coaxially surrounding the inner tube portion 51a. The first outer 51 is thus formed in the shape of a double walled cylinder, the space between the double walls being closed on the driven gear 42 side, and is fixed to the power transmitting tubular shaft 41. The first hydraulic clutch 44 also includes a first clutch inner 52 which has a first cylinder portion 52a coaxially inserted between the inner tube portion 51a and the outer tube portion 51b of the first clutch outer 51, and is fixed to the first main shaft 38. In addition, the first hydraulic clutch 44 includes a plurality of first friction plates 53 relatively non-rotatably engaged with the outer tube portion 51b of the first clutch outer 51, and a plurality of second friction plates 54 relatively non-rotatably engaged with the first cylinder portion 52a of the first clutch inner 52 and disposed alternately with the first friction plates 53. A pressure receiving plate 55 is relatively non-rotatably engaged with the outer tube portion 51b of the first clutch outer 51, while facing the friction plate (the second friction plate 54, in this embodiment), disposed at an end portion on the opening end side of the first clutch outer 51, of the first and second friction plates 53 and 54 disposed in an alternately stacked form. An annular first piston 56 is fitted liquid-tightly and slidably to the inner tube portion 51a and the outer tube portion 51b of the first clutch outer 51 in such a manner that the first and second friction plates 53 and 54 are disposed between the first piston 56 and the receiving plate 55. A first clutch spring 58 is disposed in a contracted state between a retainer 57, which is engaged with the inner tube portion 51a of the first clutch outer 51, and the first piston 56.

A first hydraulic chamber 59 is formed between the closed end of the first clutch outer 51 and the first piston 56, and the first clutch spring 58 provides a spring force that urges the first piston 56 toward a side for increasing the volume of the first hydraulic chamber 59. When an oil pressure is exerted on the first hydraulic chamber 59, the first piston 56 is moved against the spring force of the first clutch spring 58 toward a side for pressingly clamping the first and second friction plates 53 and 54 between itself and the pressure receiving plate 55. As a result, the first and second friction plates 53 and 54 are put into frictional engagement with each other, whereby power is transmitted between the first clutch outer 51 and the first clutch inner 52, i.e., between the power transmitting tubular shaft 41 and the first main shaft 38.

The second hydraulic clutch 45 includes a second clutch outer 61 which has an inner tube portion 61a surrounding the power transmitting tubular shaft 41, and an outer tube portion 61b coaxially surrounding the inner tube portion 61a. The second clutch outer 61 is thus formed in the shape of a double walled cylinder, the space between the double walls being closed on the driven gear 42 side, and is fixed to the power transmitting tubular shaft 41. The second hydraulic clutch 45 includes a second clutch inner 62 which has a first cylinder portion 62a coaxially inserted between the inner tube portion 61a and the outer tube portion 61b of the second clutch outer 61, and is fixed to the second main shaft 39. The second hydraulic clutch 45 also includes a plurality of third friction plates 63 relatively non-rotatably engaged with the outer tube portion 61b of the second clutch outer 61, and a plurality of fourth friction plates 64 relatively non-rotatably engaged with the first cylinder portion 62a of the second clutch inner 62 and disposed alternately with the third friction plates 63. In addition, the second hydraulic clutch 45 includes a pressure receiving plate 65 relatively non-rotatably engaged with the outer tube portion 61b of the second clutch outer 61 while facing the friction plate (the fourth friction plate 64, in this embodiment), disposed at an end portion on the opening end side of the second clutch outer 61, of the third and fourth friction plates 63 and 64 disposed in an alternately stacked form. An annular second piston 66 is fitted liquid-tightly and slidably to the inner tube portion 61a and the outer tube portion 61b of the second clutch outer 61 in such a manner that the third and fourth friction plates 63 and 64 are disposed between the second piston 66 and the receiving plate 65, and a second clutch spring 68 is disposed in a contracted state between a retainer 67, which is engaged with the inner tube portion 61a of the second clutch outer 61, and the second piston 66.

A second hydraulic chamber 69 is formed between the closed end of the second clutch outer 61 and the second piston 66, and the second clutch spring 68 displays a spring force that urges the second piston 66 toward a side for increasing the volume of the second hydraulic chamber 69. When an oil pressure is exerted on the second hydraulic chamber 69, the second piston 66 is moved against the spring force of the second clutch spring 68 toward a side for pressingly clamping the third and fourth friction plates 63 and 64 between itself and the pressure receiving plate 65. As a result, the third and fourth friction plates 63 and 64 are put into frictional engagement with each other, whereby power is transmitted between the second clutch outer 61 and the second clutch inner 62, i.e., between the power transmitting tubular shaft 41 and the second main shaft 39.

As seen in FIG. 2, a portion of the second crankcase cover 23 at a location corresponding to the first main shaft 38 is provided with a passage hole 72, the passage hole 72 being coaxial with the first main shaft 38. A holding collar 71, which projects radially inward, is provided at an axially intermediate portion of the passage hole 72. A small-diameter tube portion 38a, coaxially provided at one end portion of the first main shaft 38, is supported on an inner end portion of the passage hole 72 through a roller bearing 73, and an outer end portion of the passage hole 72 is closed with a cap 74 in a liquid-tight manner.

A wall member 75 is fitted liquid-tightly in the passage hole 72 at a position between the holding collar 71 and the cap 74, whereby a first oil pressure supply chamber 76 is formed between the wall member 75 and the holding collar 71. In addition, a second oil pressure supply chamber 77 is formed between the wall member 75 and the cap 74. Moreover, the first main shaft 38 is coaxially provided with a bottomed center hole 78 opening on one end side thereof, with the closed end of the center hole 78 located at an axial position corresponding to that of the second hydraulic clutch 45. An outer tube 79, having one end portion supported liquid-tightly by the holding collar 71, is coaxially inserted in the center hole 78. An inner tube 80, having one end portion held liquid-tightly by the wall member 75, is coaxially inserted in the outer tube 79. The other end of the inner tube 80 extends to the inner side of the center hole 78 beyond the other end of the outer tube 79.

A plurality of first communicating passages 81, which communicate with the first hydraulic chamber 59 of the first hydraulic clutch 44, are provided radially over the range of the first main shaft 38, the power transmitting tubular shaft 41, and the inner tube portion 51a of the first clutch outer 51. An annular first oil passage 83 permits the first communicating passages 81 to communicate with the first oil pressure supply chamber 76, and is formed between the inner peripheries of the outer tube 79 and the center hole 78 and the outer periphery of the inner tube 80. In addition, second communicating passages 82, which communicate with the second hydraulic chamber 69 of the second hydraulic clutch 45, are provided radially over the range of the first main shaft 38, the power transmitting tubular shaft 41, and the inner tube portion 61a of the second clutch outer 61. A second oil passage 84 permits the second communicating passages 82 to communicate with the second oil pressure supply chamber 77, and is formed between the inner tube 80 and an inner end portion of the center hole 78. An annular partition member 85 partitions the first and second oil passages 83 and 84 from each other in a liquid-tight manner, and is provided between the outer periphery of an inner end portion of the inner tube 80 and the inner periphery of the center hole 78. In addition, an annular partition member 86 partitions the first oil passage 83 from the exterior in a liquid-tight manner, and is provided between the outer periphery of the outer tube 79 and the inner periphery of the center hole 78.

Figure 3:
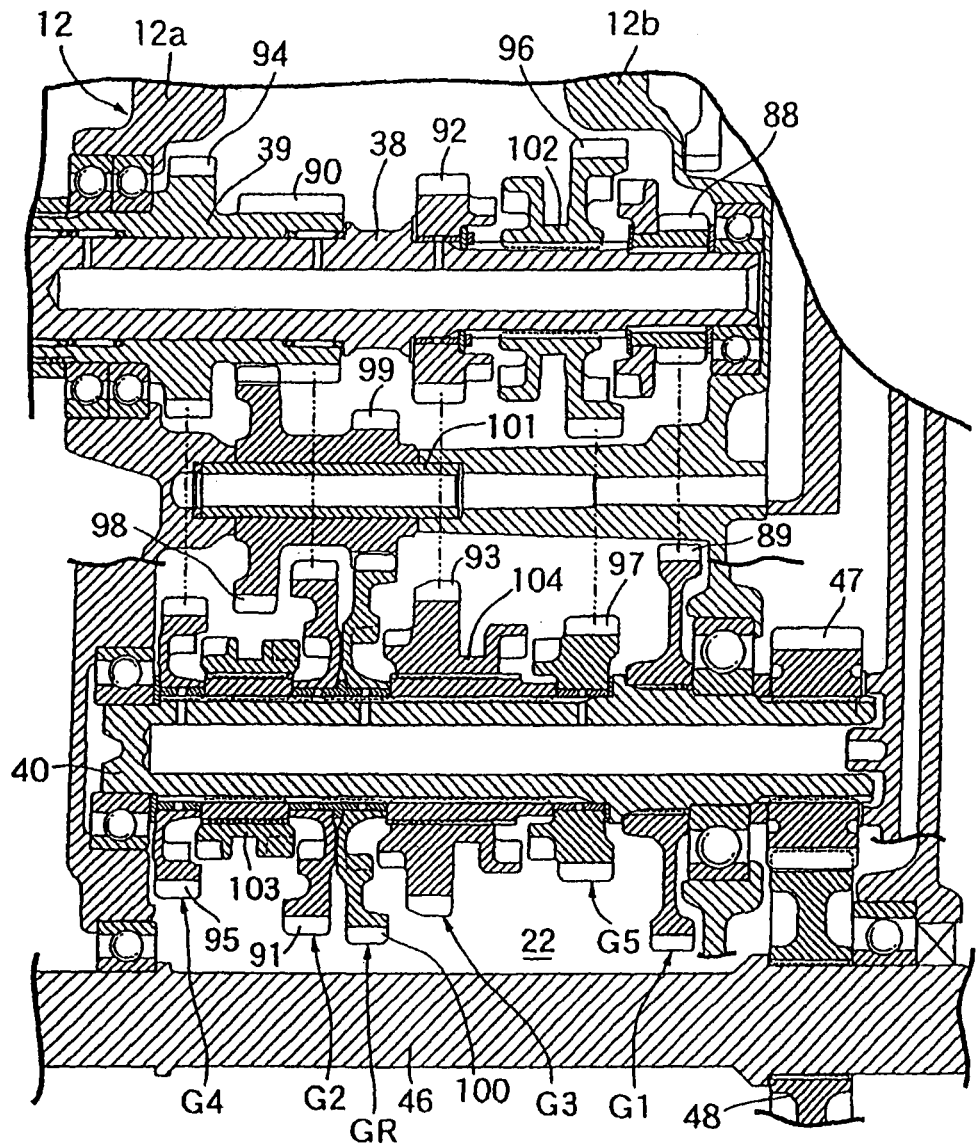
FIG. 3 is an enlarged side sectional side view of the speed-stage gear train showing the configuration of gear trains on the main and output shafts of the power unit.

Referring to FIG. 3 also, a plurality of selectively engageable speed-stage gear trains, e.g., first speed to fifth speed gear trains G1 to G5 and a reverse gear train GR are contained in the crank chamber 22. The first speed, third speed and fifth speed gear trains G1, G3 and G5 are provided between the first main shaft 38 and the transmission output shaft 40, whereas the second speed gear train G2, the fourth speed gear train G4 and the reverse gear train GR are provided between the second main shaft 39 and the transmission output shaft 40.

The first speed gear train G1 includes a first speed drive gear 88 relatively rotatably mounted on the first main shaft 38, and a first speed driven gear 89 fixed to the transmission output shaft 40 and meshed with the first speed drive gear 88. The third speed gear train G3 includes a third speed drive gear 92 relatively rotatably supported on the first main shaft 38, and a third speed driven gear 93 relatively non-rotatably supported on the transmission output shaft 40 so as to be capable of axial movement within a limited range and engageable with the third speed drive gear 92. The fifth speed gear train G5 includes a fifth speed drive gear 96 relatively non-rotatably supported on the first main shaft 38 so as to be capable of axial movement within a limited range, and a fifth speed driven gear 97 relatively rotatably supported on the transmission output shaft 40.

In addition, the second speed gear train G2 includes a second speed drive gear 90 integrally provided on the second main shaft 39, and a second speed driven gear 91 rotatably supported on the transmission output shaft 40 and meshed with the second speed drive gear 90. The fourth speed gear train G4 includes a fourth speed drive gear 94 integrally provided on the second main shaft 39, and a fourth speed driven gear 95 relatively rotatably supported on the transmission output shaft 40 and meshed with the fourth speed drive gear 94. The reverse gear train GR includes the second speed drive gear 90, a first intermediate gear 98 meshed with the second speed drive gear 90, a second intermediate gear 99 formed as one body with the first intermediate gear 98, and a reverse driven gear 100 relatively rotatably supported on the transmission output shaft 40 and meshed with the second intermediate gear 99. The first and second intermediate gears 98 and 99 are integral with each other, and are rotatably supported on an intermediate shaft 101. The intermediate shaft 101 is supported at both end portions thereof by the case halves 12a and 12b of the crankcase 12, with its axis set parallel to the first main shaft 38, the second main shaft 39 and the transmission output shaft 40.

A first shifter 102 is integrally provided with the fifth speed drive gear 96, and is spline connected to the first main shaft 38 between the first speed and third speed drive gears 88 and 92. The first shifter 102 is movable along the axial direction of the first main shaft 38 while being changed over among a position for being engaged with the first speed drive gear 88 to engage the first speed gear train, a position for engagement with the third speed drive gear 92, and an intermediate position for engagement with neither of the first speed and third speed drive gears 88 and 92.

In addition, a second shifter 103 is relatively non-rotatably supported on the transmission output shaft 40 between the second speed driven gear 91 and the fourth speed driven gear 95, so as to be axially movable within a limited range. The second shifter 103 is movable along the axial direction of the transmission output shaft 40 while being changed over among a position for being engaged with the second speed drive gear 91 to engage the second speed gear train G2, a position for being engaged with the fourth speed driven gear 95 to engage the fourth speed gear train G4, and an intermediate position for engagement with neither of the second speed and fourth speed driven gears 91 and 95.

Furthermore, a third shifter 104 is integrally provided with the third speed driven gear 93, and is relatively non-rotatably borne on the transmission output shaft 40 between the fifth speed driven gear 97 and the reverse driven gear 100, so as to be axially movable within a limited range. The third shifter 104 is movable along the axial direction of the transmission output shaft 40 while being changed over among a position for engagement with the fifth speed driven gear 97, a position for engagement with the reverse driven gear 100, and an intermediate position for engagement with neither of the fifth speed driven gear 97 and the reverse driven gear 100.

The first to third shifters 102 to 104 are moved by turning a shift drum 200. The first speed gear train G1 is engaged by interconnecting the first shifter 102 with the first speed drive gear 88 while setting the second and third shifters 103 and 104 in their intermediate positions. The second speed gear train G2 is engaged by interconnecting the second shifter 103 with the second speed driven gear 91 while setting the first and third shifters 102 and 104 in their intermediate positions, and the third speed gear train G3 is engaged by interconnecting the first shifter 102 with the third speed drive gear 92 while setting the second and third shifters 103 and 104 in their intermediate positions. The fourth speed gear train G4 is engaged by interconnecting the second shifter 103 with the fourth speed driven gear 95 while setting the first and third shifters 102 and 104 in their intermediate position. The fifth speed gear train G5 is engaged by interconnecting the third shifter 104 with the fifth speed driven gear 97 while setting the first and second shifters 102 and 103 in their intermediate positions, and the reverse gear train GR is engaged by interconnecting the third shifter 104 with the reverse driven gear 100 while setting the first and second shifters 102 and 103 in their intermediate positions. In addition, when all the first to third shifters 102 to 104 are set in their intermediate positions, a neutral condition is obtained in which none of the first speed to fifth speed gear trains G1 to G5 or the reverse gear train GR is engaged.

When the first hydraulic clutch 44 is in the power transmitting condition and power is transmitted from the crankshaft 16 to the first main shaft 38, power is transmitted from the first main shaft 38 to the transmission output shaft 40 through the alternatively engaged one of the first speed, third speed and fifth speed gear trains G1, G3 and G5. When the second hydraulic clutch 45 is in the power transmitting condition and power is transmitted from the crankshaft 16 to the second main shaft 39, power is transmitted from the second main shaft 39 to the transmission output shaft 40 via the alternatively engaged one of the second speed gear train G2, the fourth speed gear train G4 and the reverse gear train GR.

As schematically shown in FIG. 4, an oil pressure control system for controlling the oil pressures exerted on the first and second hydraulic clutches 44 and 45 includes: a common oil passage 115 connected to the oil pressure source 110 in common for the first and second hydraulic clutches 44 and 45; a control valve 111 intermediately provided in the common oil passage 115; a first individual oil passage 113 communicating with the first oil pressure supply chamber 76 communicating with the first hydraulic chamber 59 of the first hydraulic clutch 44; a second individual oil passage 114 communicating with the second oil pressure supply chamber 77 communicating with the second hydraulic chamber 69 of the second hydraulic clutch 45; and a selector valve 112 for selectively connecting the common oil passage 115 to either the first or second individual oil passage 113 or 114.

The control valve 111 is a spool valve for operating a spool 117 according to an oil pressure acting on a pilot chamber 116, and a first normally open type solenoid valve 118 is interposed between the oil pressure source 110 on the upstream side of the control valve 111 and the pilot chamber 116. The first normally open type solenoid valve 118 releases a pilot pressure in the pilot chamber 116 when it is ON (closed), and exerts the oil pressure from the oil pressure source 110 on the pilot chamber 116 as a pilot pressure when it is OFF (open). When the solenoid valve 118 is closed and the pilot pressure in the pilot chamber 116 is released, the spool 117 of the control valve 111 is in a first position for blocking the passage of oil pressure from the oil pressure source 110 to the common oil passage 115 on the downstream side of the control valve 111 and further releasing the oil pressure in the common oil passage 115. Conversely, when the solenoid valve 118 is opened, and a pilot pressure acts on the pilot chamber 116, the spool 117 is moved into a second position putting the common oil passage 115 into a communicating state so as to exert the oil pressure from the oil pressure source 110 on the common oil passage 115 on the downstream side of the control valve 111.

The selector valve 112 is a spool valve for operating a spool 120 according to an oil pressure acting on a pilot chamber 119. A second normally open type solenoid valve 121 is interposed between the common oil passage 115 on the downstream side of the control valve 111 and the pilot chamber 119. The second normally open type solenoid valve 121 releases a pilot pressure in the pilot chamber 119 when it is OFF (open), and exerts the oil pressure in the common oil passage 115 on the downstream side of the control valve 111 onto the pilot chamber 119 as a pilot pressure when it is ON (closed).

When the solenoid valve 121 is open and the pilot pressure in the pilot chamber 119 is released, the spool 120 of the selector valve 112 is in a first position permitting communication between the common oil pressure 115 and the first individual oil passage 113, and permitting communication between the second individual oil passage 114 and a second releasing oil passage 123. When a pilot pressure acts on the pilot chamber 119, the spool 120 is moved to a second position permitting communication between the common oil passage 115 and the second individual oil passage 114, and permitting communication between the first individual oil passage 113 and a first releasing oil passage 122.

Figure 5:
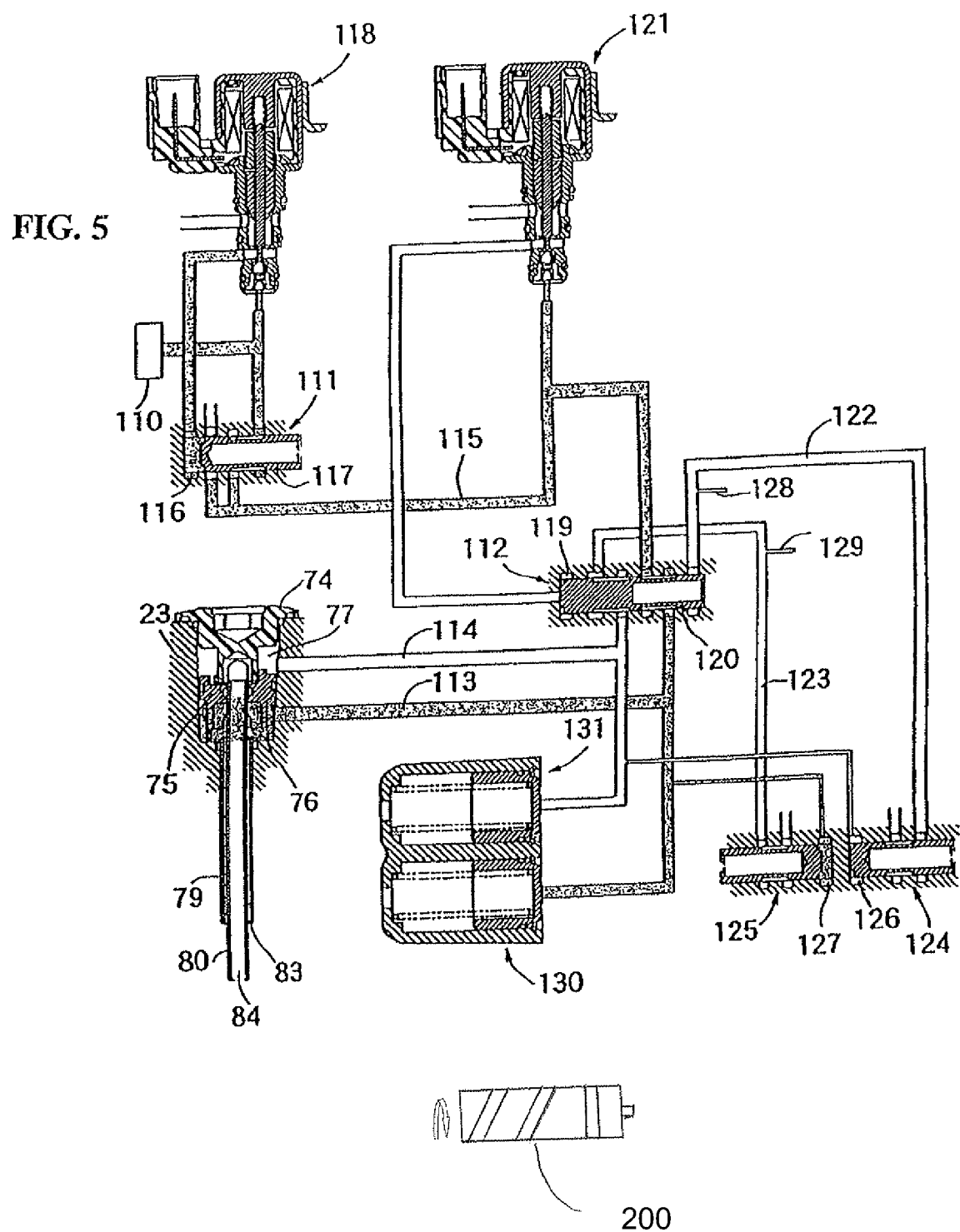
FIG. 5 is a schematic diagram of the oil pressure control system according to a first embodiment thereof, showing the configuration of the oil pressure control system at the time of shifting from the neutral condition to a forward-side starting condition.

The oil pressure in the first releasing oil passage 122 is released by opening of a first discharge control valve 124, which is opened when the oil pressure in the second individual oil passage 114 is high. The oil pressure in the second releasing oil passage 123 is released by opening of a second discharge control valve 125, which is opened when the oil pressure in the first individual oil passage 113 is high. Moreover, discharge ports 128 and 129 are provided at intermediate portions of the first and second releasing oil passages 122 and 123, respectively. The discharge ports 128 and 129 allow for gradually releasing the oil pressures in the first and second releasing oil passages 122 and 123 when the first and second discharge control valves 124 and 125 are closed. Furthermore, accumulators 130 and 131, which stabilize the oil pressures in the individual oil passages 113 and 114, are connected to the first and second individual oil passages 113 and 114, respectively. As shown in FIGS. 4 and 5, in the first embodiment hereof, each of the accumulators 130, 131 includes a spring-loaded piston slidably disposed in a bore. The accumulators 130, 131 function as fluid damping members which are operatively fluidly connectable with the respective hydraulic clutches 44, 45 for damping an initial application of oil pressure thereto.

In the neutral condition where every one of the first speed to fifth speed gear trains G1 to G5 and the reverse gear train GR is in the non-engaged state, the first normally open type solenoid valve 118 is put into the ON state and the second normally open type solenoid valve 121 is put into the OFF state. This ensures that the control valve 111 is put into the condition of releasing the oil pressure in the common oil passage 115 on the downstream side of the control valve 111, and, even if the second normally open type solenoid valve 121 is in the condition of causing the pilot chamber 119 to communicate with the common oil passage 115, the oil pressure acting on the pilot chamber 119 of the selector valve 112 is lowered, so that the selector valve 112 is put into the condition of making the first individual oil passage 113 communicate with the common oil passage 115 and making the second individual oil passage 114 communicate with the second releasing oil passage 123, as shown in FIG. 4. Therefore, in the neutral condition, the oil pressure in the first hydraulic clutch 44 is released, and the first hydraulic clutch 44 is in the disconnected state, whereas the oil pressure in the second hydraulic clutch 45 is released by the discharge of the working fluid through the discharge port 129.

At the time of engaging the first speed gear train G1, which is a forward low-speed gear train, and starting the vehicle in the forward running direction from the neutral condition, the second normally open type solenoid valve 121 is immediately put into the ON (closed) state in response to the start of the shifting operation, while the first solenoid valve 118 also remains in the ON (closed) state as discussed above. When a predetermined time has passed from the start of energizing of the second normally open type solenoid valve 121, and it is judged by a change in gear position due to turning of the shift drum 200 that the first speed gear train G1 is completely engaged, the first normally open type solenoid valve 118 is then put into the OFF (open) state.

As a result, as shown in FIG. 5, the oil pressure in the oil pressure source 110 acts on the oil passages ranging to the downstream end of the common oil passage 115, and the oil pressure in the pilot chamber 119 of the selector valve 112 is released; therefore, the spool 120 in the selector valve 112 is put into the same position as in the neutral condition, the oil pressure from the oil pressure source 110 acts on the first individual oil passage 113 to put the first hydraulic clutch 44 into the connected state, and power is transmitted from the crankshaft 16 to the first speed gear train G1. On the other hand, the second individual oil passage 114 is left communicating with the second releasing oil passage 123, and, since the second discharge control valve 125 is opened, the oil pressure in the second individual oil passage 114 is completely released.

Figure 6A:
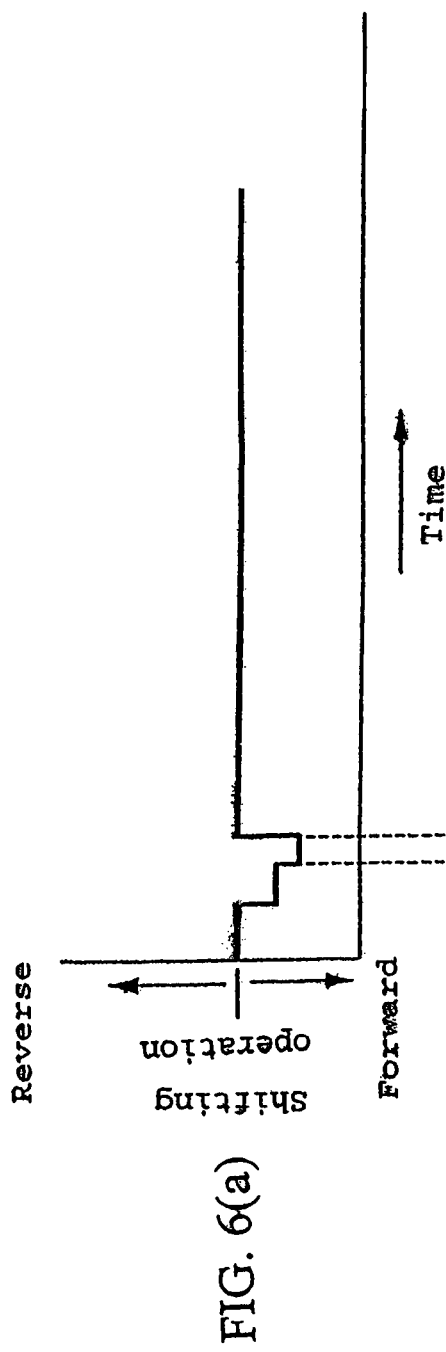
FIG. 6(*a*) is a graph of shifting operation versus time, and shows a shifting operation at the time of shifting from the neutral condition to the forward-side starting condition.
Figure 6B:
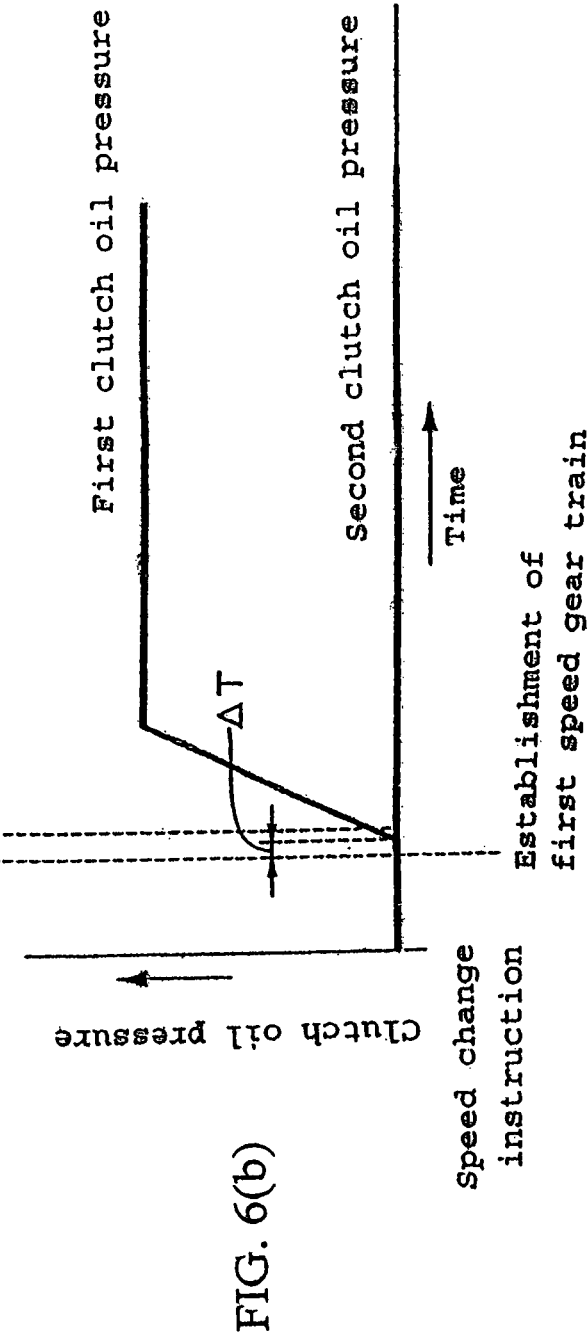

At the time of starting the vehicle in the forward direction from the neutral condition as just-mentioned, the shifting operation and the clutch oil pressure vary as shown in FIGS. 6(a) and 6(b). In accordance with a given speed change instruction, the shift drum 200 is turned in the forward direction as shown in FIG. 6(a), and the first speed gear train G1 is engaged in the condition where the speed is kept constant during the turning of the shift drum 200. Next, after a time ΔT has passed from the engagement of the first speed gear train G1, the oil pressure in the first hydraulic clutch 44 is increased, as shown in FIG. 6(b). Specifically, at the time of starting in the forward direction from the neutral condition, the control valve 111 controls the oil pressure in the first hydraulic clutch 44 in such a manner that the oil pressure in the first hydraulic clutch 44, having been lowered in the neutral condition, is maintained in the lowered state and, thereafter, is increased in response to the complete engagement of the first speed gear train G1. Also, as shown in FIG. 5 and as indicated by the slope of the line in FIG. 6B, the presence of the accumulator 131 in a parallel circuit with the first individual oil passage 113 smoothes and dampens the initial application of hydraulic pressure to the first hydraulic clutch 44, rather than applying such pressure all at once. This gradual application of hydraulic pressure avoids an unwanted speed-change shock. In addition, the oil pressure in the second hydraulic clutch 45, having been lowered in the neutral condition, remains so in response to the complete engagement of the first speed gear train G1.

At the time of engaging the reverse gear train GR and starting the vehicle in the reverse (rearward) running direction from the neutral condition, the second normally open type solenoid valve 121 having been in the OFF state in the neutral condition is maintained in the OFF state. In addition, when the complete engagement of the reverse gear train GR is confirmed, for example based on a change in gear position due to turning of the shift drum 200 (not shown), the first normally open type solenoid valve 118 is put into the OFF state. As a result, as shown in FIG. 7, an oil pressure is exerted on the pilot chamber 119 of the selector valve 112 so as to put the spool 120 of the selector valve 112 into the position of making the second individual oil passage 114 communicate with the common oil passage 115, whereby the second hydraulic clutch 45 is put into the connected state, and power is transmitted from the crankshaft 16 to the reverse gear train GR. On the other hand, the first individual oil passage 113 is put into the state of communicating with the first releasing oil passage 122, whereby the oil pressure in the first individual oil passage 113 is completely released.

At the time of starting toward the reverse side from the neutral condition as just-mentioned, in accordance with a given speed change instruction, the shift drum 200 is turned in the reverse direction as indicated by the line in FIG. 6(c), and the reverse gear train GR is engaged in the condition where the speed is kept constant during the turning of the shift drum 200. Next, after a time ΔT has passed from the engagement of the reverse gear train GR, the oil pressure in the second hydraulic clutch 45 is increased.

Specifically, at the time of starting in the reverse direction from the neutral condition, the control valve 111 controls the oil pressure in the second hydraulic clutch 45 in such a manner that the oil pressure in the second hydraulic clutch 45 is maintained in a lowered state and, thereafter, is increased in response to the complete engagement of the reverse gear train GR (FIG. 6(d)). In addition, the oil pressure in the first hydraulic clutch 44, having been lowered in the neutral condition, remains so in response to the complete engagement of the reverse gear train GR.

Now, the operations of the first embodiment will be described below. Upon shifting from the neutral condition, where the oil pressures in the first and second hydraulic clutches 44 and 45 are in a lowered state, to the starting condition for engaging the first speed gear train G1 so as to start the vehicle in the forward running direction, the oil pressure in the first hydraulic clutch 44 is controlled by the control valve 111 in such a manner that the oil pressure in the first hydraulic clutch 44, having been lowered in the neutral condition, is maintained in the lowered state and, thereafter, is increased in response to the complete engagement of the first speed gear train G1. In addition, upon shifting from the neutral condition to the starting condition for engaging the reverse gear train G1 so as to start the vehicle in the reverse (rearward) running direction, the oil pressure in the second hydraulic clutch 45 is controlled by the control valve 111 in such a manner that the oil pressure in the second hydraulic clutch 45, having been lowered in the neutral condition, is maintained in the lowered state and, thereafter, is increased in response to the complete engagement of the reverse gear train GR.

In other words, at the time of engagement of the first speed gear train G1 or the reverse gear train GR, which is a starting gear train, the power transmission between these gear trains G1, GR and the crankshaft 16 is perfectly interrupted (disconnected), so that a speed-change shock is prevented from being generated at the time of starting.

In addition, since the first and second hydraulic clutches 44, 45 are provided between the crankshaft 16 and the first and second main shafts 38, 39 and the control valve 111 is connected in common to all the hydraulic clutches 44, 45, variations in the oil pressures in both of the hydraulic clutches 44, 45 can be controlled by the single control valve 111.

The first hydraulic clutch 44 transmits power from the crankshaft 16 to the plurality of speed-stage gear trains G1, G3, G5 including at least the first speed gear train G1 serving as a forward low-speed gear train, while the second hydraulic clutch 45 transmits power from the crankshaft 16 to the plurality of speed-stage gear trains G2, G4, GR including the reverse gear train GR, and generation of shocks at the times of forward-side starting and reverse-side starting are prevented by use of the single control valve 111.

Furthermore, the common oil passage 115 commonly supplies both the first and second individual oil passages 113 and 114, which in turn respectively communicate individually with the first and second hydraulic clutches 44 and 45. Between the common oil pressure passage 115 and the oil pressure source 110, there is interposed the control valve 111 in such a manner as to permit changeover between the condition where the oil pressure source 110 communicates with the common oil passage 115 and the condition where the oil pressure in the common oil passage 115 is released. The selector valve 112 permits alternative changeover between the communication of the first individual oil passage 113 with the common oil passage 115, and the communication of the second individual oil passage 114 with the common oil passage 115. The selector valve is interposed between the common oil passage 115 and the first and second individual oil passages 113 and 114. Thus, variations in the oil pressures in the two hydraulic clutches 44 and 45 can be controlled by the simple hydraulic circuit composed by use of the single control valve 111 and the single selector valve 112.

Figure 8:
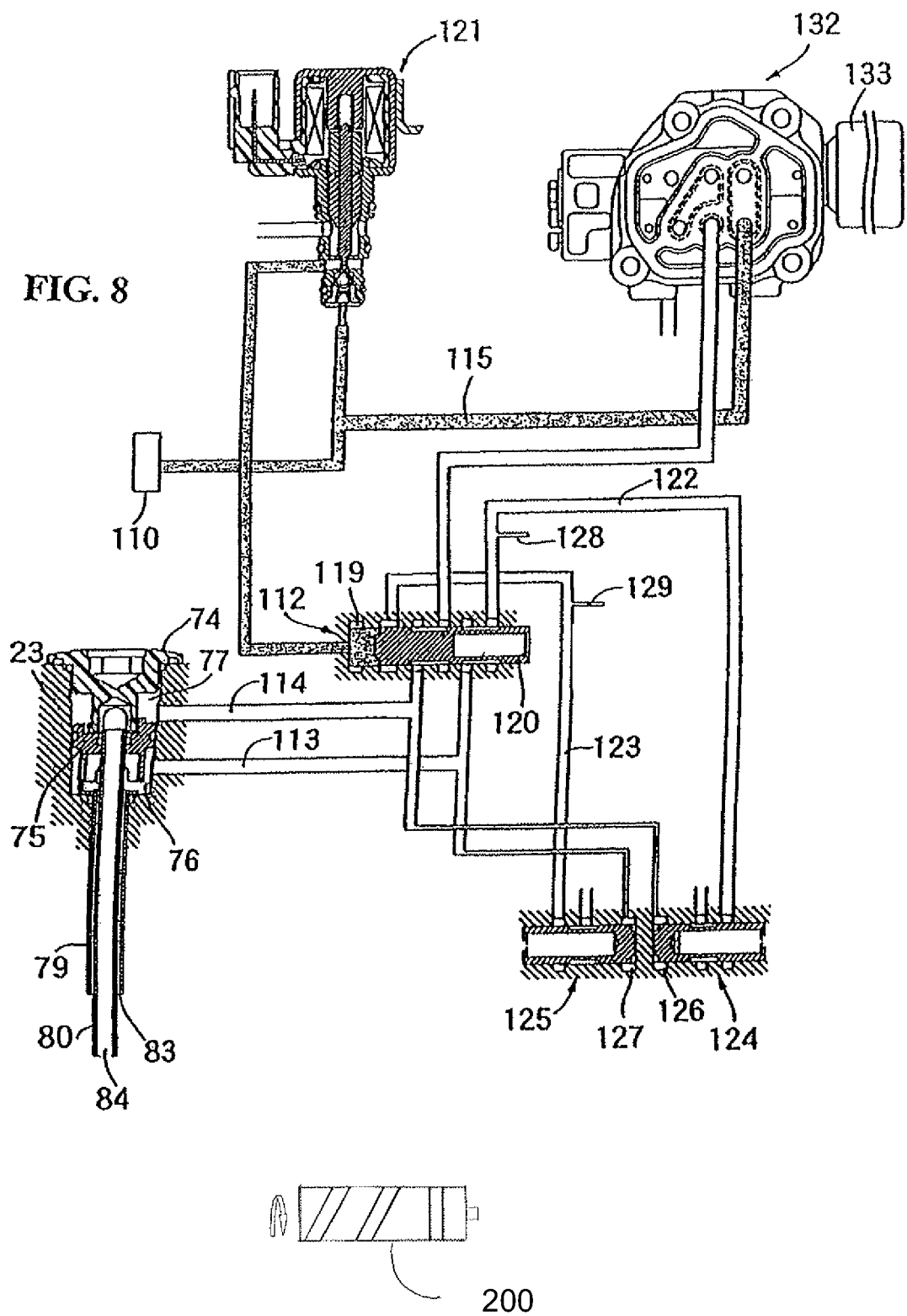
FIG. 8 is a schematic diagram of the oil pressure control system according to a second embodiment thereof, showing the configuration of the oil pressure control system in a neutral condition.

FIG. 8 shows a second embodiment of the present invention. The parts corresponding to those in the first embodiment above are denoted by the same reference symbols as used above, and detailed description of those parts will be omitted.

A linear solenoid valve 132 as a control valve for varying an output oil pressure according to an electric current supplied to a solenoid 133 is interposed, in place of the control valve 111 in the first embodiment, at an intermediate portion of the common oil passage 115 communicating with the oil pressure source 110. In addition, the accumulators 130 and 131 used in the first embodiment are not connected respectively to the first and second individual oil passages 113 and 114.

When the solenoid 133 is in the ON state, the linear solenoid valve 132 interrupts the common oil passage 115 and, simultaneously, discharges the working fluid in the common oil passage 115 on the downstream side of the linear solenoid valve 132. In the neutral condition, as shown in FIG. 8, the working fluid in the common oil passage 115 on the downstream side of the linear solenoid valve 132 is discharged by the linear solenoid valve 132; in addition, the normally open type solenoid valve 121 is in the OFF state, the oil pressure from the oil pressure source 110 is acting on the pilot chamber 119 of the selector valve 112, and the selector valve 112 is in the state of making the second individual oil passage 114 communicate with the common oil passage 115 and making the first individual oil passage 113 communicate with the discharge port 128. Therefore, in the neutral condition, the oil pressure in the second hydraulic clutch 45 is released from the linear solenoid valve 132, the second hydraulic clutch 45 is in the disconnected state, and the oil pressure in the first hydraulic clutch 44 is released by the discharge of the working fluid through the discharge port 128.

At the time of engaging the first speed gear train G1 as the forward low-speed gear train and starting the vehicle in the forward direction from the neutral condition, the linear solenoid valve 132 is put into the OFF state and simultaneously the normally open type solenoid valve 121 is put into the ON state when complete engagement of the first speed gear train G1 is confirmed, for example, by a change in gear position due to turning of the shift drum 200.

As a result, the oil pressure of the oil pressure source 110 acts on the oil passages ranging to the downstream end of the common oil passage 115, and the oil pressure in the pilot chamber 119 of the selector valve 112 is released; therefore, the selector valve 112 is put into the state of making the first individual oil passage 113 communicate with the common oil passage 115 and making the second individual oil passage 114 communicate with the discharge port 129, so that the oil pressure from the oil pressure source 110 acts on the first individual oil passage 113 to put the first hydraulic clutch 44 into the connected state, whereby power is transmitted from the crankshaft 16 to the first speed gear train G1. On the other hand, the second individual oil passage 114 is left communicating with the second releasing oil passage 123, and the second discharge control valve 125 is opened, so that the oil pressure in the second individual oil passage 114 is completely released.

In other words, at the time of starting in the forward direction from the neutral condition, the linear solenoid valve 132 controls the oil pressure in the first hydraulic clutch 44 in such a manner that the oil pressure in the first hydraulic clutch 44, having been lowered in the neutral condition, is kept in the lowered state and, thereafter, is increased in response to the complete engagement of the first speed gear train G1.

At the time of engaging the reverse gear train GR and starting the vehicle in the reverse (rearward) direction from the neutral condition, the linear solenoid valve 132 is put into the OFF state and simultaneously the normally open type solenoid valve 121 is put into the OFF state when complete engagement of the reverse gear train GR is confirmed, for example, by a change in gear position due to turning of the shift drum 200. As a result, an oil pressure is exerted on the pilot chamber 119 of the selector valve 112, whereby the spool 120 of the selector valve 112 is put into the position of making the second individual oil passage 114 communicate with the common oil passage 115 in the same manner as in the neutral condition, and the second hydraulic clutch 45 is thereby put into the connected state, whereby power is transmitted from the crankshaft 16 to the reverse gear train GR. On the other hand, the first individual oil passage 113 is made to communicate with the first releasing oil passage 122, and the first discharge control valve 124 is opened, so that the oil pressure in the first individual oil passage 113 is completely released.

In other words, at the time of starting in the reverse (rearward) direction from the neutral condition, the linear solenoid valve 132 controls the oil pressure in the second hydraulic clutch 45 in such a manner that the oil pressure in the second hydraulic clutch 45 is maintained in the lowered state and, thereafter, is increased in response to the complete engagement of the reverse gear train GR.

While the embodiments of the present invention have been described above, the invention is not limited to the above embodiments, and various design modifications are possible within the scope of the invention as described in the claims.

What is claimed is:

1. A transmission for transmitting power from a power unit of a vehicle to a drive train component of the vehicle,
   the power unit comprising
      a crankshaft;
      a first main shaft; and
      a second main shaft;
   the transmission comprising:
      a shift drum;
      a first hydraulic clutch;
      a first fluid damping member which is operatively fluidly connectable with said first hydraulic clutch for damping an initial application of oil pressure thereto;
      a second hydraulic clutch;
      a second fluid damping member which is operatively fluidly connectable with said second hydraulic clutch for damping an initial application of oil pressure thereto;
      a transmission output shaft; and
      a plurality of gear trains disposed between the transmission output shaft and the main shafts,
   wherein when the first hydraulic clutch is actuated, power is transmitted from the first main shaft to the output shaft through one of said gear trains which is either a first speed gear train, a third speed gear train, or a fifth speed gear train, and wherein when the second hydraulic clutch is actuated, power is transmitted from the second main shaft to the output shaft through one of said gear trains which is either a second speed gear train, a fourth speed gear train or a reverse gear train; and wherein the transmission further comprises an oil pressure control system for controlling oil pressures applied to the first and second hydraulic clutches, the oil pressure control system comprising:

an oil pressure source;

a common oil passage connected to the oil pressure source and supplying oil in common to both the first and second hydraulic clutches;

a control valve provided in the common oil passage;

a first individual oil passage communicating with the first hydraulic clutch;

a second individual oil passage communicating with second hydraulic clutch;

a selector valve, the selector valve configured so as to permit switching a connection between the common oil passage and one of the first and second individual oil passages, a first releasing passage communicating with the selector valve, and a second releasing passage communicating with the selector valve, wherein, when the selector valve is permitting communication of the first individual oil passage with the common oil passage the selector valve is also permitting communication of the second individual oil passage with the second releasing passage, and when the selector valve is permitting communication of the second individual oil passage with the common oil passage, the selector valve is also permitting communication of the first individual oil passage with the first releasing passage, and further wherein the control valve is operable to control oil pressures in said first and second hydraulic clutches so that during operation of the transmission, the oil pressure in one of said hydraulic clutches corresponding to a selected initial gear train is automatically maintained in a lowered state such that the clutch corresponding to the selected initial gear train is disengaged during and immediately following a shifting operation for shifting from a neutral condition to a movement-initiating engagement with the selected initial gear train which is either the first speed gear train or the reverse gear train, in order to initiate motion of the vehicle, and oil pressure in the hydraulic clutch corresponding to the selected initial gear train is thereafter increased after a predetermined time following the engagement of said selected initial gear train, wherein completion of engagement of said selected initial gear train is judged by a change in position due to turning of said shift drum;

and wherein the oil pressure control system further comprises:

a first solenoid valve interposed between the common oil passage and the oil pressure source at a location upstream of the control valve;

a second solenoid valve interposed between the common oil passage and the selector valve at a location downstream of the control valve;

a first pressure discharge valve in communication with the first individual oil passage; and a second pressure discharge valve in communication with the second individual oil passage;

wherein when the transmission is in the neutral condition,
the first solenoid valve is closed,
the second solenoid valve is open,
the control valve releases oil pressure in the common oil passage downstream of the control valve,
the selector valve permits communication between the first individual oil passage and the common oil passage whereby pressure in the first individual oil passage is released and the first hydraulic clutch remains in a disconnected state, and further permits communication between the second individual oil passage and the second pressure discharge valve, such that pressure in the second individual oil passage is released and the second hydraulic clutch also remains in a disconnected state.

2. The transmission for the vehicle as set forth in claim 1, wherein when the neutral-condition transmission is shifted to engage the first speed gear train,
the second solenoid valve is closed in response to the shifting operation,
after a predetermined time from the closure of the second solenoid valve, the first solenoid valve is made to open,
the control valve permits oil pressure generated by the oil pressure source to be applied to the common oil passage,
the selector valve permits communication between the first individual oil passage and the common oil passage whereby pressure in the first individual oil passage is applied to the first hydraulic clutch such that the first hydraulic clutch is placed in a connected state with the first speed gear train, and further permits communication between the second individual oil passage and the second pressure discharge valve, the second pressure discharge valve being open such that pressure in the second individual oil passage is released and the second hydraulic clutch remains in a disconnected state.

3. The transmission for the vehicle as set forth in claim 1, wherein when the neutral-condition transmission is shifted to engage the reverse speed gear train,
the second solenoid valve remains in an open state in response to the shifting operation,
after a predetermined time from the shifting operation, the first solenoid valve is made to open,
the control valve permits oil pressure generated by the oil pressure source to be applied to the common oil passage, and
the selector valve permits communication between the second individual oil passage and the common oil passage, whereby pressure in the second individual oil passage is applied to the second hydraulic clutch such that the second hydraulic clutch is placed in a connected state with the reverse gear train, and further permits communication between the first individual oil passage and the first pressure discharge valve, the first pressure discharge valve being open such that pressure in the first individual oil passage is released and the first hydraulic clutch remains in a disconnected state.

* * * * *